US007673831B2

(12) United States Patent
Steele et al.

(10) Patent No.: US 7,673,831 B2
(45) Date of Patent: Mar. 9, 2010

(54) SMALL UNMANNED AIR VEHICLE SYSTEM FOR DEPLOYING AND TOWING A SENSOR IN A TOW MEDIUM AND METHODS RELATED THERETO

(75) Inventors: Daniel W. Steele, Clay, NY (US); John H. Goodemote, Oneida, NY (US); David J. Erickson, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 842 days.

(21) Appl. No.: 11/422,933

(22) Filed: Jun. 8, 2006

(65) Prior Publication Data

US 2009/0224099 A1    Sep. 10, 2009

(51) Int. Cl.
    *B64C 39/02*    (2006.01)
(52) U.S. Cl. .................................... 244/1 TD
(58) Field of Classification Search ............... 244/1 TD; B64C 39/02
    See application file for complete search history.

(56) References Cited

U.S. PATENT DOCUMENTS 3,159,806 A * 12/1964 Piasecki ..................... 367/106
6,422,506 B1 * 7/2002 Colby ....................... 244/1 TD

OTHER PUBLICATIONS http://en.wikipedia.org/wiki/MQ-9_Reaper as found in the .pdf file attached as "MQ-9_Reaper.pdf".*
Throw Me a Rope, NewScientist Apr. 30, 2005.

* cited by examiner

*Primary Examiner*—Timothy D Collins
(74) *Attorney, Agent, or Firm*—William Greener; Bond, Schoeneck & King, PLLC

(57) ABSTRACT

Embodiments of the invention are directed to an unmanned air vehicle (UAV) system and a small unmanned air vehicle (SUAV) system for deploying and towing a sensor in a tow medium, and to methods related thereto. A UAV-sensor towing package comprises a fixed-wing UAV including a control and signal processing platform, a long range data RF link operably connected to the control and signal processing platform, a UAV wireless data link operably connected to the control and signal processing platform, and a tow body deployment system operably connected to the control and signal processing platform; a tow line attached at an end thereof to the UAV; a tow body attached to another end of the tow line; and a communications link including a transmitter/receiver component coupled to the tow line, and a T/R wireless data transmission link (194) operably connected with the transmitter/receiver component and the UAV wireless data link.

9 Claims, 10 Drawing Sheets

SMALL UNMANNED AIR VEHICLE SYSTEM FOR DEPLOYING AND TOWING A SENSOR IN A TOW MEDIUM AND METHODS RELATED THERETO

BACKGROUND OF THE INVENTION

1. Field of the Invention

Embodiments of the invention are generally directed to the field of remote sensing and surveillance. More particularly, embodiments of the invention are directed to an unmanned air vehicle (UAV) system and a small unmanned air vehicle (SUAV) system for deploying and towing a sensor in a tow medium, and to methods related thereto.

2. Description of Related Art

Remote sensing and surveillance have many applications. The particular field of applications addressed by the embodiments of the invention relate to the towing of a tethered sensor system (tow body) through an atmospheric or an underwater tow medium by a tow vehicle. In a typical example, an active or passive SONAR-based sensor is attached to a tow line that may be attached to a water surface vessel. The sensor is dragged through the water to sense submerged and/or waterborne objects or to map the floor of the water body, for example. An exemplary tactical application of such sensing is tracking a submerged submarine. In this scenario, however, the use of a waterborne tow vessel becomes impractical. Although a ship has the power and thrust capacity to tow a submerged tow body at a desired speed and general direction, the resources and energy consumption are costly. Furthermore, the intended target will not likely be anywhere near the surface vessel, and the surface vessel will not be able to travel to the intended surveillance location in a timely manner.

To overcome these and other challenges, rotary winged aircraft have been typically employed as tow vehicles. Rotary winged aircraft are advantageous in that they can be dispatched relatively quickly and, by their nature, can hover for accurate deployment of a tow body. In addition, they are particularly suited to the relatively static towing constraints of dipped or submerged sensors, as well as those of, e.g., chemical-biological-radiological-nuclear (CBRN) sensors or other tactical atmospheric or local environment sensors.

Disadvantageously, however, rotary winged aircraft normally used with the above-mentioned sensor deployment and towing maneuvers have relatively limited range, endurance and payload capacity compared to a fixed wing aircraft such as an autonomous unmanned air vehicle (UAV) or a small autonomous unmanned air vehicle (SUAV), for instance.

In contrast to rotary winged aircraft, fixed wing aircraft generally require continuous and relatively high airspeeds to operate without stalling and ultimately crashing. Thus fixed wing aircraft are not normally associated with the static towing maneuvers and deployment requirements of local surveillance sensors, CBRN sensors, submerged SONAR tow bodies and the like.

The inventors have recognized, however, the many advantages of using a UAV or an SUAV as the tow vehicle for the types of tow bodies and sensor applications referred to above. These advantages include, but are not limited to, low cost, high endurance, quick dispatch, large payload capacity, long persistence sensing, long range delivery and mission adaptability. There is thus a recognized need for UAV and/or SUAV systems for deploying and towing air or water-based sensors flown in a manner to maintain airspeeds necessary for continuous flight while flexibly managing tow position and tow velocities relative to the earth's surface.

These advantages and benefits as well as others will become more evident to persons skilled in the art in view of the following description and drawings.

SUMMARY OF THE INVENTION

Embodiments of the invention are directed to UAV and SUAV systems for deploying and towing a sensor in a tow medium, and methods related thereto.

According to an embodiment of the invention, a UAV package comprises a fixed-wing UAV including a control and signal processing platform, a long range data RF link operably connected to the control and signal processing platform, a UAV to tow body wireless data link operably connected to the control and signal processing platform, and a tow body deployment system operably connected to the control and signal processing platform; a tow line attached at an end thereof to the UAV; a tow body attached to another end of the tow line; and a communications link including a transmitter/receiver component coupled to the tow line, and a T/R wireless data transmission link operably connected with the transmitter/receiver component and the UAV wireless data link. In an aspect, the communications link further includes a physical data transmission medium operably connected at one end thereof to the transmitter/receiver component and at the other end thereof to the tow body. According to an aspect, the tow line is a composite tow line including a first tow line portion having a first length and a first tow line elasticity characteristic, and a second tow line portion having a second length and a second tow line elasticity characteristic that are different than the first tow line length and elasticity characteristic. According to an aspect, the tow body is a SONAR based sensor for use in an underwater tow medium. In an alternative aspect, the tow body is a CBRN-based sensor for use in an atmospheric tow medium.

Another embodiment of the invention is directed to a method for towing a tethered tow body through a tow medium along a tow track with a fixed-wing UAV at a tow body velocity that is less than a stall speed of the UAV along a forward UAV tow path. The method steps include providing a UAV, a tow line attached at an end thereof to the UAV, and a tow body attached to another end of the tow line; flying the UAV to locate the tow body in a selected location of a tow medium; and, maneuvering the UAV along a generally non-horizontally-oriented, generally circular flight path ('altitude tilted orbit') with a net forward (surface) velocity along the forward UAV tow path corresponding to the tow track, wherein the tow body velocity in the tow medium is less than a stall speed of the UAV along the forward UAV tow path. According to an aspect, the UAV is a SUAV. According to alternative aspects, the method steps include towing the tow body through a liquid tow medium and through an atmospheric tow medium. In a further aspect, the method comprises the step of communicating data over a communication path between the UAV and the tow body, wherein the communication data is propagated in a physical transmission medium over a portion of the communication path and is wirelessly transmitted over another portion of the communication path.

Another embodiment is directed to a method for autonomously executing a UAV mission. The method comprises the steps of launching a UAV package from a launch platform, wherein the UAV package includes a UAV, a tow line attached at an end thereof to the UAV, and a tow body attached to another end of the towline; flying the UAV package to a designated target area; releasing the tow body and a length of the tow line in a controlled manner at a first UAV altitude;

ascending the UAV to a second altitude greater than the first altitude as the tow body and the tow line are being released; locating the tow body in a tow medium and maneuvering the UAV into an altitude tilted orbit, wherein the altitude tilted orbit lies generally in a plane that is generally perpendicular to the tow line; flying the UAV, in the altitude tilted orbit, in a forward UAV tow path, wherein the UAV has a forward surface speed ranging between zero and a maximum speed of the UAV; collecting data with the tow body; gathering the tow body and the length of tow line back to the UAV; and flying the UAV package to a designated destination point. According to an aspect, the method further includes the step of communicating information between the tow body and the UAV over a communications path between the tow body and the UAV.

To summarize certain embodiments more generally, the sensor to be towed is released at an appropriate altitude while the UAV transitions to a circular, orbital flight. The UAV's flight orbits around an initial deployment point for the dropped sensor, with sufficient tow cable length to accommodate the scope of towline to the UAV. A circular orbit minimizes tow thrust, approaching zero, while allowing the UAV to fly at virtually any speed necessary to maintain flight. A tow is initiated by transitioning UAV flight to an altitude tilted orbit. This tilted orbit is roughly perpendicular to the locus of the center of revolution of the towline, as it revolves in space following the attached UAV. Advancing the plane of this tilted orbit over time generates a tow velocity vector that is directly linked to the degree of advance per unit time (i.e., like an advancing screw thread). With the goal of constant tow velocity the UAV corkscrews through space at a horizontal (surface) velocity anywhere from zero to approaching the maximum speed of the UAV itself.

Thus, small, fixed wing, unmanned air vehicles (UAVs, SUAVs) can be used to tow air and water-based sensors while maintaining UAV airspeeds necessary for continuous flight, while further managing tow position and tow velocities relative to the earth's surface.

These and other objects, advantages and benefits provided by embodiments of the invention will now be set forth in detail with reference to the detailed description and the drawing figures and as defined in the appended claims.

DETAILED DESCRIPTION OF A PREFERRED EMBODIMENT OF THE INVENTION

Figure 1:
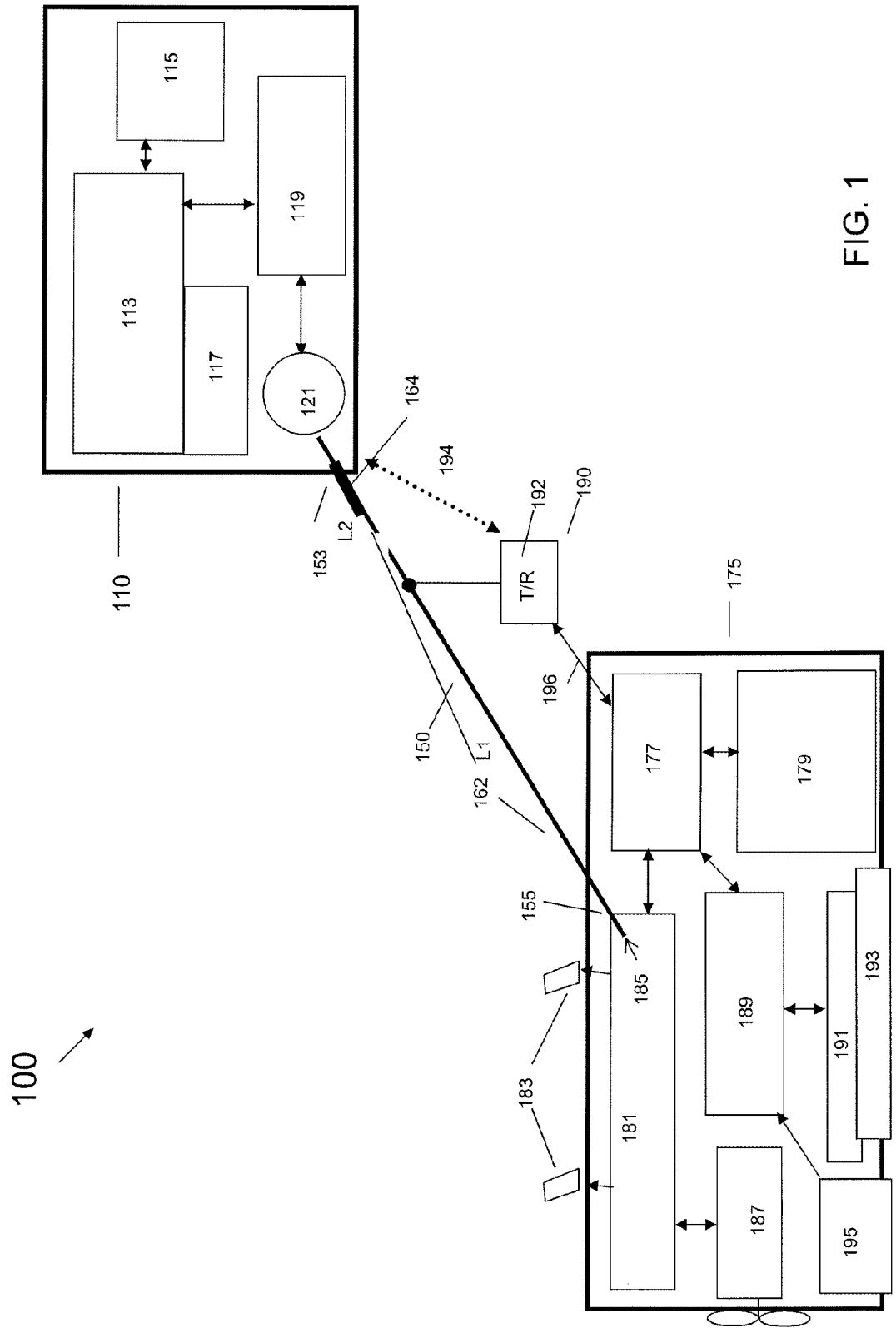
FIG. 1 is a schematic block diagram of a UAV-sensor towing package according to an embodiment of the invention.

An embodiment of the invention will now be described with reference to FIG. 1. A small unmanned air vehicle (SUAV) package 100 includes a fixed wing SUAV 110, a tow line 150 attached at an end 153 thereof to the SUAV 110 and attached at another end 155 thereof to a tow body 175. The SUAV package 100 also includes a communications link 190 comprising a transmitter/receiver component 192 coupled to the tow line 150 at a particular location.

According to an exemplary embodiment as further illustrated in FIG. 1, the SUAV 110 includes a control and signal processing platform 113, a long range data RF link 115 operably connected to the control and signal processing platform, an SUAV wireless data link 117 operably connected to the control and signal processing platform, and a tow body carriage and deployment system 119 operably connected to the control and signal processing platform. A reel mechanism 121 is in operative engagement with the tow body deployment system 119 and provides the mechanism for feeding out and reeling in the tow line 150 during mission execution. Fixed wing unmanned air vehicles (UAVs) and SUAVs, as well as the command/control, communications and payload deployment components are known in the art. The subject matter of co-pending U.S. patent application Ser. No. 10/908,255 filed on May 4, 2005 and Ser. No. 10/908,278 filed on May 5, 2005, and commonly assigned, is incorporated herein by reference in its entirety to the fullest extent allowed by applicable laws and rules.

Referring to FIGS. 1 and 8, the tow body 175 according to the exemplary embodiment is a sonar based sensor for use in an underwater tow medium. The sonar based sensor tow body 175 includes a power supply platform 177 that also incorporates audio and communications data interfaces. A battery 179 is releasably coupled to the power source platform 177. Reference numeral 181 represents a control platform for steering control with the aid of external fins 183, and a tow line release 185. The tow body 175 further includes a speed regulator 187 operably coupled to the steering and servo control platform 181, and an electronics platform 189 including audio power amplifiers, transmitter/receiver components, preamplifiers and the like (not shown). The figures also illustrate a port transducer 191, a starboard transducer 193 and a passive Omni transducer 195 operably coupled to the electronics platform 189.

In the exemplary embodiment of a sonar based sensor for towing through an underwater environment, the communications link 190 will utilize a wireless RF data transmission link 194 for data transmission between the transmitter/receiver component 192 and the data link 117 located in the SUAV 110. The communications link 190 will be supportably attached to the tow line 150 at a location that will always be above the surface of the water. As shown schematically in FIG. 2, a high gain directional antenna 195 for the wireless data link is coupled adjacent the communications link 190. The directional orientation of the tow line 150 between the communications link 190 and the SUAV 110 provides an efficient directional path for the wireless data transmission referred to above. Because the tow body will be transmitting data to the communications link 190 while it is submerged, a physical data transmission medium 196 is advantageously used between the tow body and the transmitter/receiver 192. The physical data transmission medium 196 may be an optical fiber or bundled fiber cable, a coaxial cable or other suitable data transmission medium known in the art.

An alternative sensor application is illustrated with reference to FIGS. 3A, 3B, in which a chemical-biological-radiological-nuclear (CBRN) sensor 175 may be utilized in a totally atmospheric environment for environmental monitoring near ground surface. In such a scenario, the communications link 190 may comprise a combination wireless RF data transmission link and a physical data transmission medium as described above for the sonar based underwater sensing application. The tow body for the CBRN sensor may include a position monitoring sensor such as GPS to allow precise positioning via closed loop interaction with the UAV flight control system. However, it is to be appreciated that the entire communications link between the above ground sensor and the UAV tow body may be a wireless data transmission link.

In various mission scenarios (e.g., underwater sensor towing), it may be desirable to specify the elasticity characteristics of the tow line in order to tow the tow body at a constant speed through the water. According to an exemplary aspect illustrated with reference to FIG. 1, the tow line 150 is a composite tow line including a first tow line portion 162 (unbolded black line) having a first length L1 and a first tow line elasticity characteristic, and a second tow line portion 164 (bolded black line) having a second length L2 and a second tow line elasticity characteristic, both of which are different than the first tow line length L1 and first tow line elasticity characteristic. As shown in FIG. 1, the first tow line portion 162 length L1 is greater than the second tow line length L2. A particularly useful tow line elasticity characteristic can be expressed as tow line elongation as a function of tow line tension. In the exemplary embodiment, the first tow line elasticity characteristic is less than the second tow line elasticity characteristic, meaning that the first tow line portion will elongate less than the second tow line portion for a given tow force.

Figure 4:
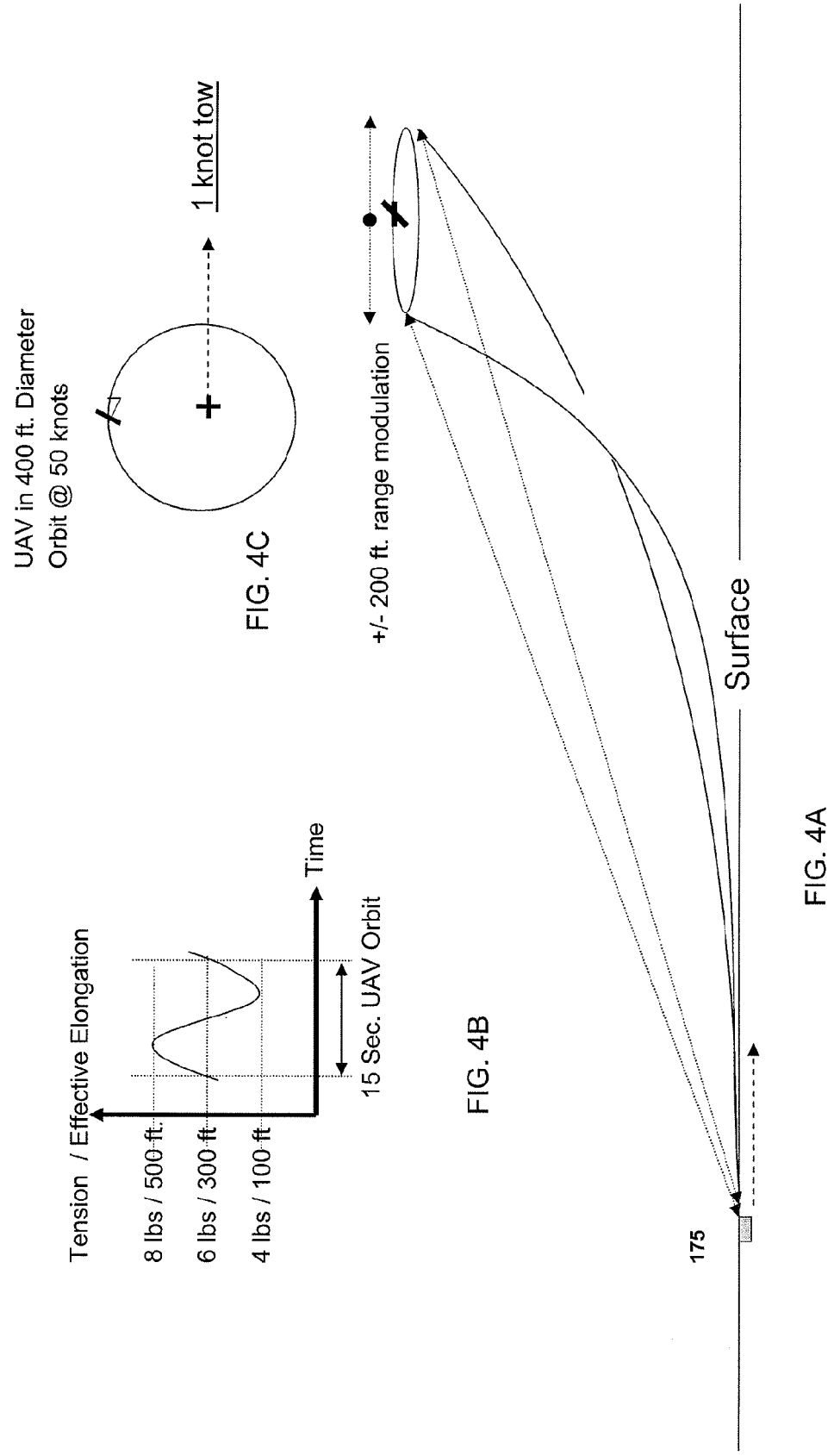
FIGS. 4A, 4B, 4C are diagrammatic illustrations of UAV-sensor tow line characteristics according to an embodiment of the invention.

FIGS. 4A, 4C provide an illustration of an SUAV towing system in which the tow line 150 includes a first tow line portion 162 consisting of a 2500 foot length L1 of 80 pound Spectra™ line and a second tow line portion 164 consisting of a 100 foot length L2 of a rubber-band type 'bungee' line. A UAV tow vehicle flown in a 400 foot diameter orbit at 50 knots orbit speed (described in greater detail below) with a forward surface velocity of 1 knot provides a tow force of 4 pounds of tension on the tow line. In the example, the first tow line portion 162 experiences an elongation of approximately 50 feet over a tension range between 4 to 8 pounds, while the 100 foot long second tow line portion 164 elongates by about 350 feet over the tension range. A similar illustration is provided with reference to FIGS. 5A, 5C, in which the elongation of the tow line 150 is minimized by maneuvering the UAV in an 'altitude tilted' orbit 410 as will be described in greater detail below. As shown in the figure, the 2500 foot length L1 of 80 pound Spectra tow line now experiences about a 25 foot elongation, which is half the elongation as illustrated in reference to FIG. 4 over a lower (4 to 6 pound) tension range. The second tow line bungee portion 164 elongation is reduced from about 350 feet to approximately 75 feet over the reduced 4 to 6 pound tension range.

Figure 6:
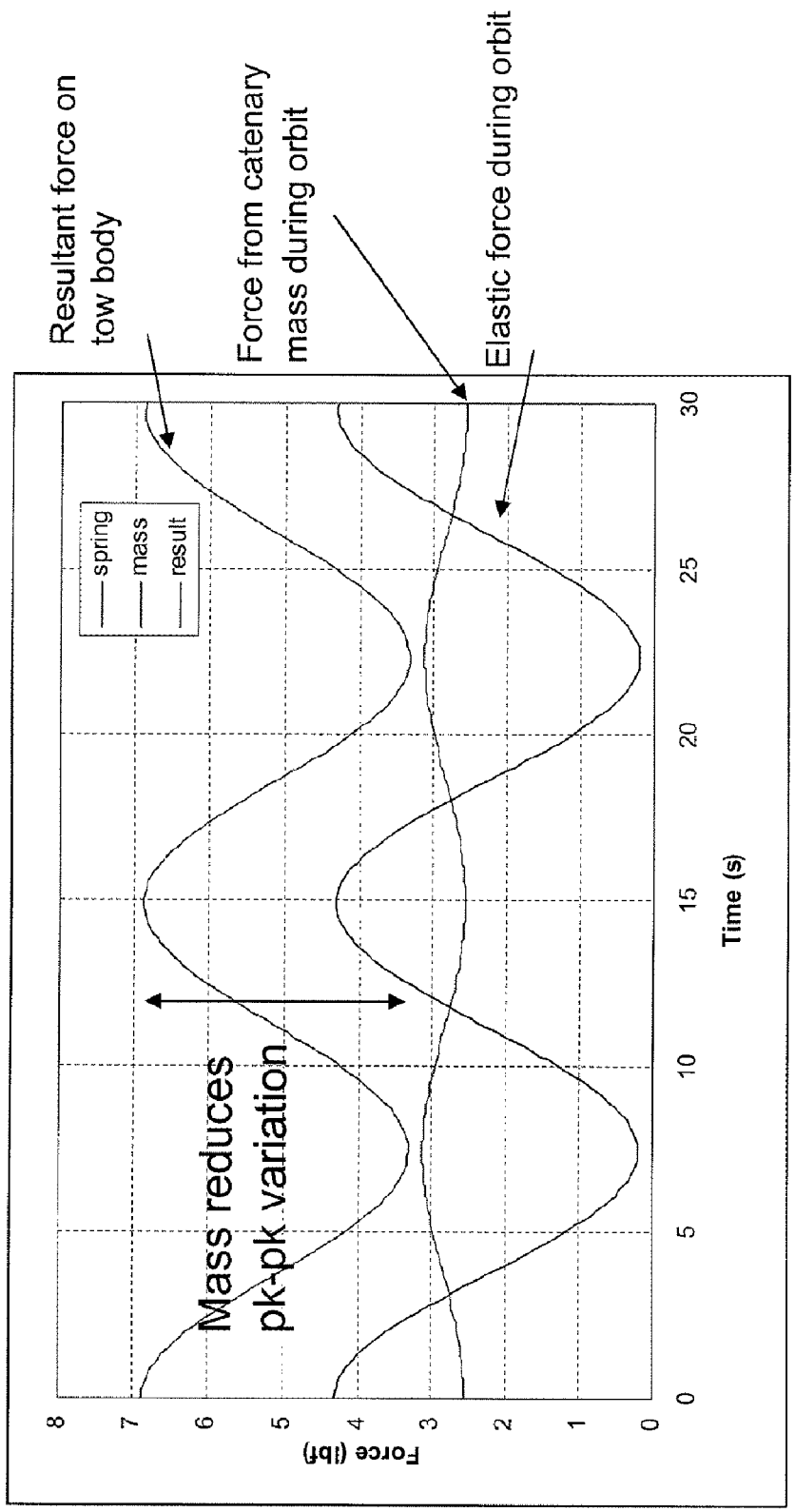
FIG. 6 is a graphical illustration of UAV-sensor tow line characteristics according to an aspect of the invention.

FIG. 6 illustrates the reducing effect of the finite mass of the tow line on the tow line force due to the catenary-like tow line shape 407 provided by the altitude tilted orbit 410 (discussed in greater detail below). By reducing the range of forces felt by the tow body (contributed by the forward force from the UAV and the forward force from the tow line due to the pendulum-like effect of the orbiting UAV), the oscillation of the tow body velocity, which follows the oscillation of the total forward force on the tow line, is reduced.

Figure 7:
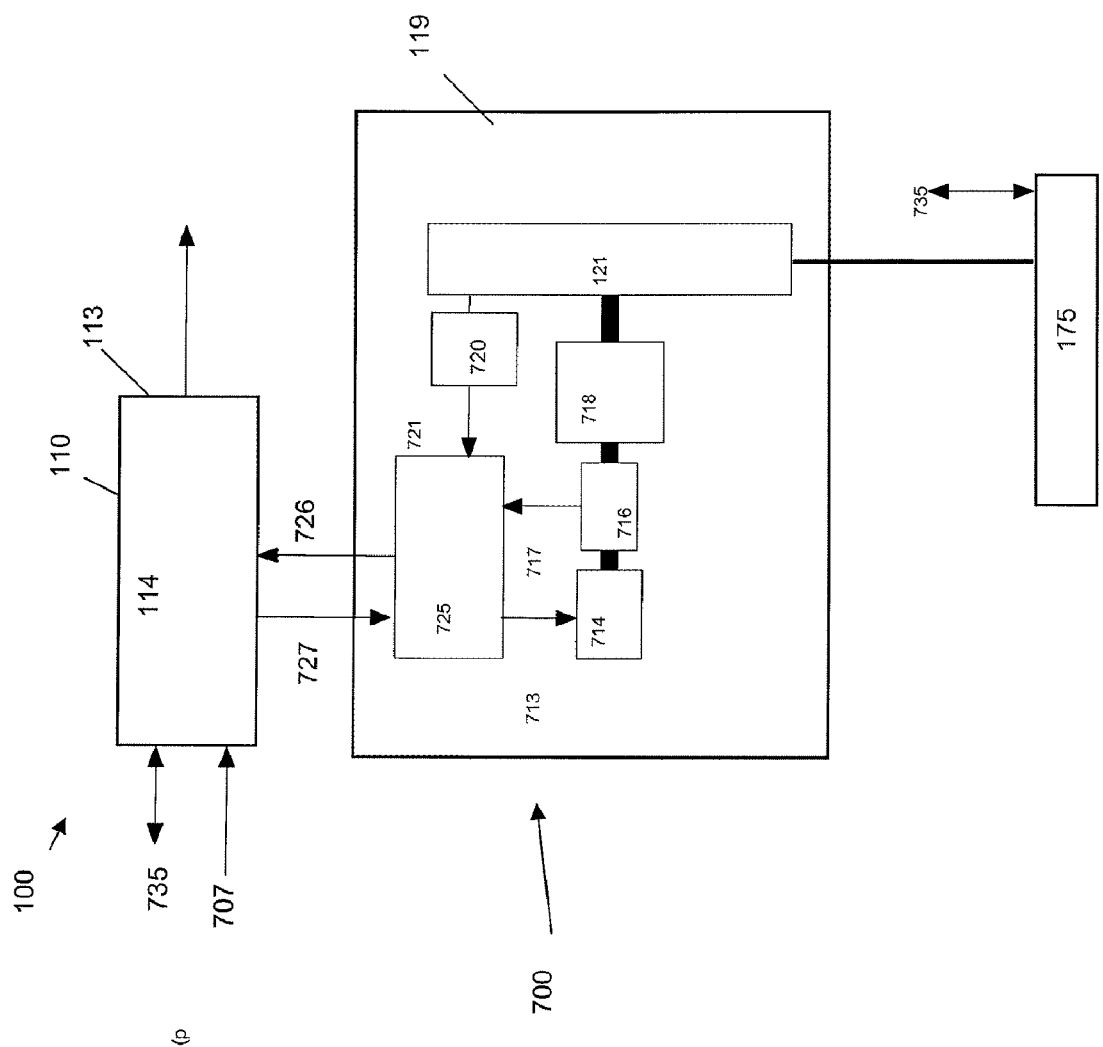
FIG. 7 is a schematic block diagram showing details of the tow body deployment system and its integration with the UAV system.

FIG. 7 provides an illustration of a tow body deployment system 119 and its integration with the UAV system 110 and tow body 175. In an exemplary aspect of an autonomous UAV system 100, an SUAV 110 includes a control and signal processing platform 113 further including autopilot platform 114. The tow body deployment system 119 is operatively disposed in a payload bay 710 of the SUAV. The exemplary tow body deployment system 119 is a closed loop system that maintains programmable cable strain and net drag on the SUAV while accommodating tow body velocity and related constraints. Tow body data and control signals 735 are transmitted to/received by the control and signal processing platform 113, along with mission command and control signals 707. The loop is essentially closed when the autopilot issues UAV flight control signals, including flight vectors and propulsion power in order to reconcile tow body navigational errors on a moment-by-moment basis. The mission command and control signals may involve deployment of the tow line/tow body in which the towline experiences a minimum torque and strain; retrieval of the tow body requiring maximum torque and strain on the tow line; or towing the tow body resulting in a nominal torque and strain on the tow line. Thus, depending upon the mission scenario, tow strain data 727 is transmitted to a control electronics platform 725. The control electronics platform sends a motor drive signal 713 to a winch motor 714 that is coupled to a torque sensor 716. Torque sense 717 is transmitted to the control electronics platform 725. A gear system 718, if required, is operatively coupled between the torque sensor 716 and a winch drum/reel 121 that contains the tow cable. Tow body data and control information 735 is received from the tow body 175 through the winch drum to a cable payout sensor 720. Payout sense 721 is transmitted to the control electronics platform 725. A net tow stress signal 726 derived from the motor drive, cable strain and payout related sensing is sent to the command/control platform 113.

Having described an exemplary UAV-sensor towing package embodiment and various aspects related thereto, method embodiments relating to control and maneuvering of a UAV-sensor towing package will now be described.

Figure 2:
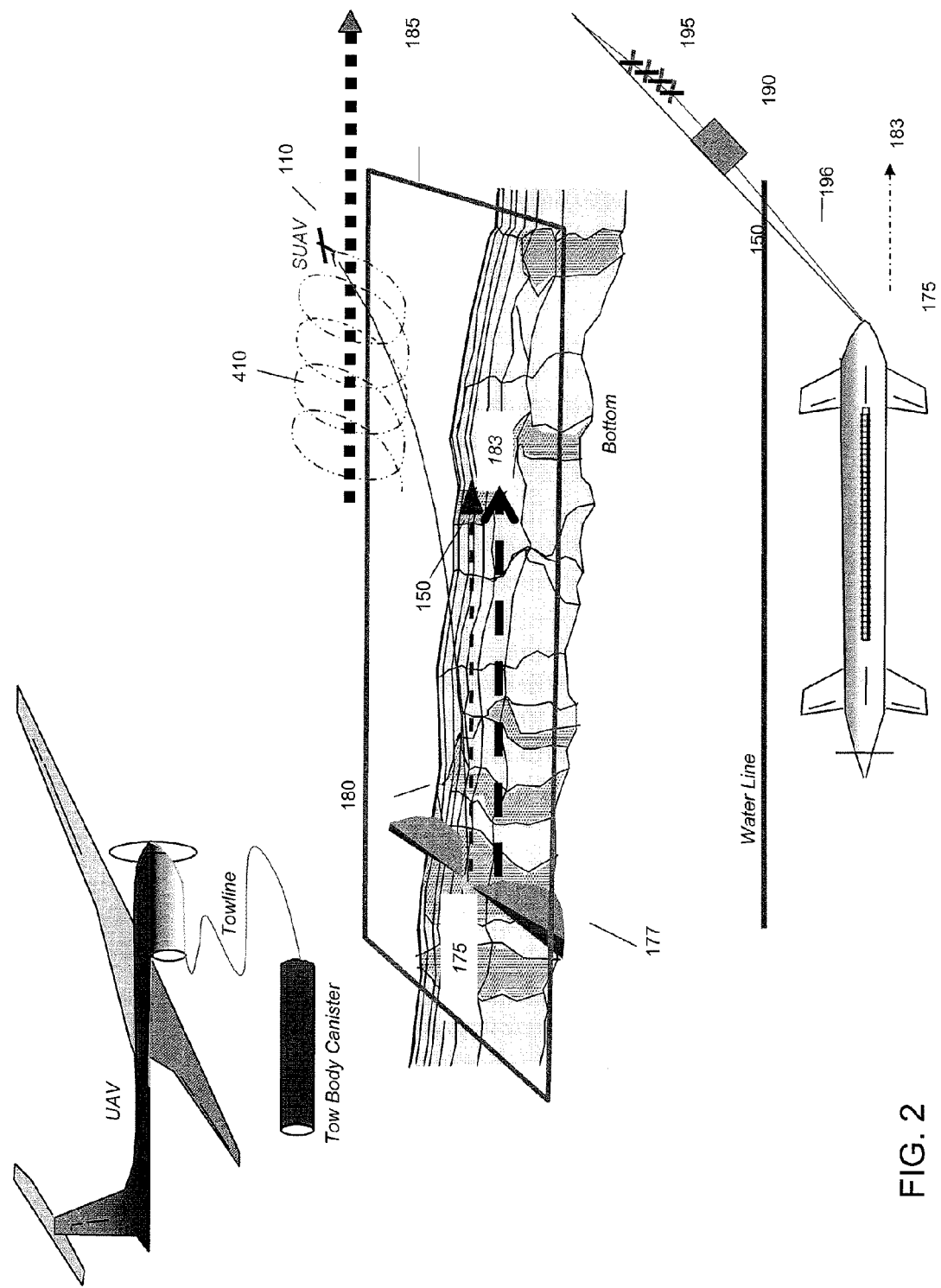
FIG. 2 is a diagrammatic illustration of a UAV-sensor package scenario according to an embodiment of the invention.

Another embodiment according to the invention, as illustrated in FIG. 2, is directed to a method for towing a tethered tow body 175 through a tow medium 180 along a tow track 183 with a fixed wing UAV 110 at a tow body velocity that is less than a stall speed of the UAV along a forward UAV tow path. As illustrated in FIG. 2, the mission scenario involves towing a sonar based tow body 175 in an underwater tow medium 180 in order to map a portion of the underwater bottom surface. In the exemplary scenario of FIG. 2, two high frequency side-scan imaging sonar beams 177 are shown.

Figure 5:
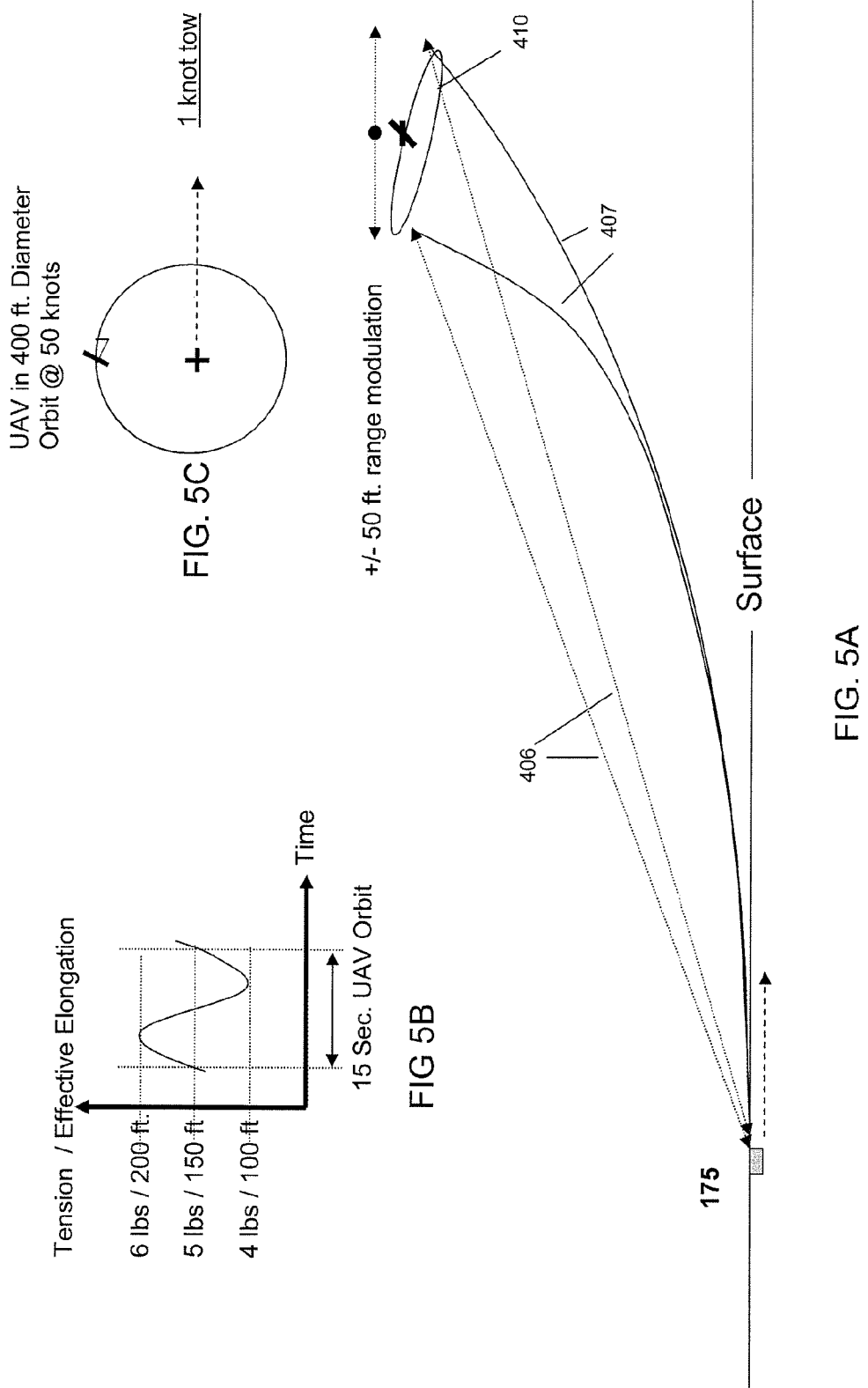
FIGS. 5A, 5B, 5C are diagrammatic illustrations of UAV-sensor tow line characteristics according to an aspect of the invention.
Figures 8A, 8B:
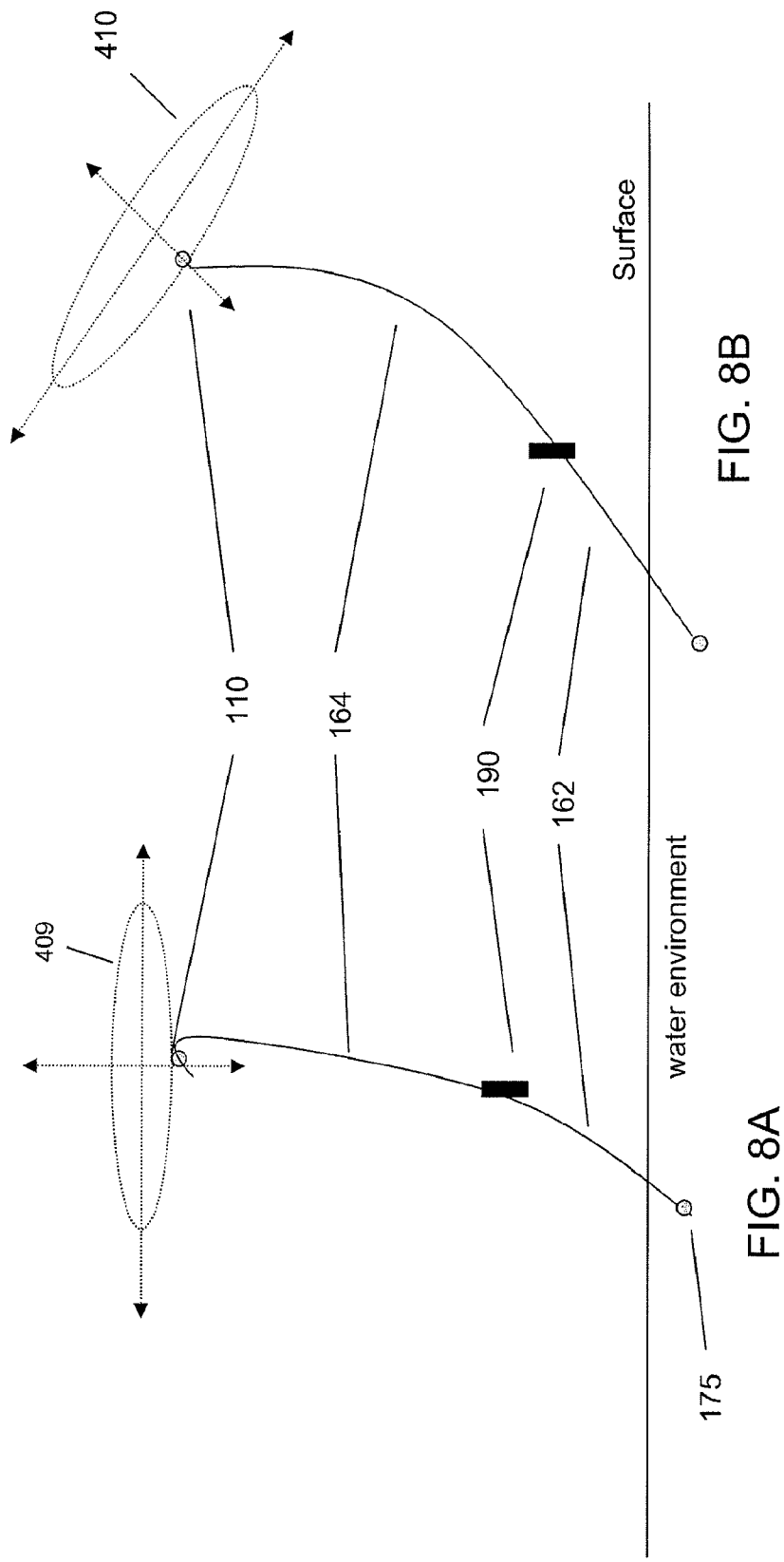
FIGS. 8A, 8B are diagrammatic illustrations of a UAV-sensor application and towing maneuver according to an embodiment of the invention.

According to the exemplary embodiment, the submerged tow body 175 is towed at a one knot nominal tow velocity. As mentioned above, fixed wing aircraft are not normally associated with this type of towing scenario because the tow body velocity is much less than the tow vehicle speed needed for stable flight, typically from 40-90 mph. As illustrated in FIG. 8B, for example, once the tow body has been located in the tow medium (see FIG. 8A; referred to as 'deployment and dipping maneuver'), the UAV 110 is controlled to maneuver in a generally circular orbit 410 that lies generally in a plane that is tilted with respect to the substantially horizontal orientation of the surface of the tow medium (e.g., ocean surface or land mass surface). As shown in FIGS. 5 and 8B, the orbital plane is tilted to be approximately perpendicular to the locus of the center of revolution of the tow line as it revolves in space following the attached UAV in its orbital flight. With reference to FIGS. 5 and 8A, the tow body 175 is released at an appropriate altitude while the UAV 110 transitions to a circular, orbital flight in a plane 409 that is generally parallel to the surface. The UAV may orbit around an initial deployment point for the dropped sensor with sufficient tow line length to accommodate the scope of tow line to the UAV. The circular orbit minimizes tow thrust, approaching zero, while allowing the UAV to fly at virtually any speed necessary to maintain flight. A tow is initiated by transitioning the UAV flight to an altitude tilted orbit 410 as shown in FIG. 8B. As illustrated schematically in FIG. 2, advancing the plane of the altitude tilted orbit 410 over time generates a tow velocity vector 185 that is directly linked to the degree of advance per unit time. With the goal of constant tow velocity, the UAV corkscrews through space at a (horizontal) surface velocity between zero up to the maximum speed of the UAV itself. As the tow body 175 is being towed through the tow medium by the UAV 110 in its altitude tilted orbit 410, sensor data can be transmitted from the tow body over a physical data line 196 to a wireless data link 190 above the water surface, whereupon it is wirelessly transmitted at 195 to the UAV 110.

Figure 9:
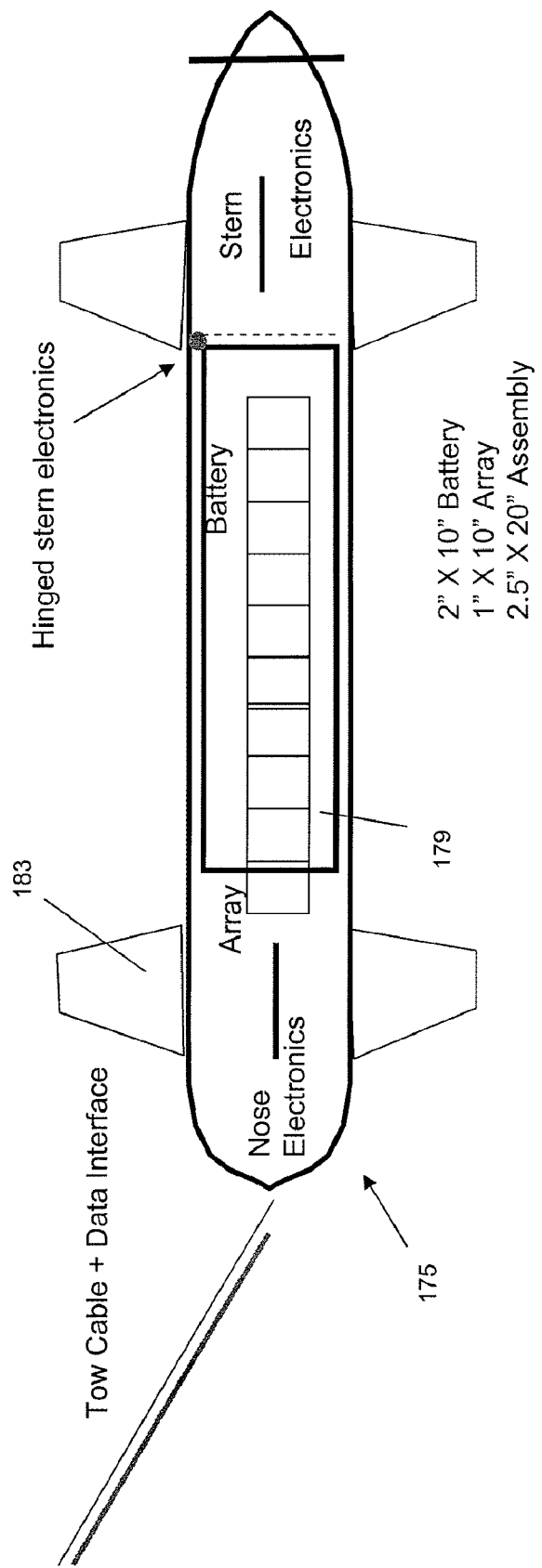
FIG. 9 is a schematic diagram of a sonar tow body according to an illustrative embodiment of the invention.

An exemplary aspect of the towing maneuver is illustrated with reference to FIGS. 1, 4A-C and 5A-C. As set forth in FIG. 1, a composite tow line 150 comprises a 2500 foot length L1 of 80 pound Spectra™ tow line 162 weighing approximately one pound, and a 100 foot length L2 of a rubber band bungee 164 weighing approximately 4 pounds. An exemplary tow body 175 is illustrated in FIG. 9. The tow body weighs approximately 3.5 pounds comprising a 2.5 pound battery which contributes 1.25 pounds of negative buoyancy, and 1 pound of electronics, array and housing, which is neutrally buoyant. The tow body has a diameter of approximately 2.5 inches by 20 inches in length. Referring to FIG. 4C, the UAV 110 is maneuvered into a generally flat, circular orbit 409 having a 400 foot diameter and an orbital velocity of 50 knots. For a one knot tow forward velocity, a tow force of 4 pounds of tension is exerted on the tow body. As shown in FIG. 4B, the tension on the tow line due to the orbital flight of the UAV oscillates between 4 and 8 pounds, causing respective effective elongation of the tow line between 100 to 500 feet over a 15 second duration UAV orbit time. According to the example, the 2500 foot tow line 162 experiences about a 50 foot elongation while the 100 foot bungee portion 164 elongates by about 350 feet over the 4 to 8 pound tension range.

Referring now to FIGS. 5A-C, it is shown that by maneuvering the UAV 110 into the altitude tilted orbit 410, the range modulation of the respective chordal distances 406 of the tow line reduces to +/−50 feet from the +/−200 foot range shown in FIG. 4A. The distributed weight and tension on the tow line creates a catenary-like tow line shape 407. The effect of the altitude tilted orbit 410 reduces the tow line tension to a range of 4 to 6 pounds while reducing the effective elongation of the tow line to between 100 to 200 feet during the 15 second UAV orbit duration. As further illustrated in FIG. 6, the catenary-like shape of the tow line provided by the UAV orbital flight provides a forward bias force that reduces the resultant force on the tow body from the elastic force on the tow line during orbit.

Figure 3:
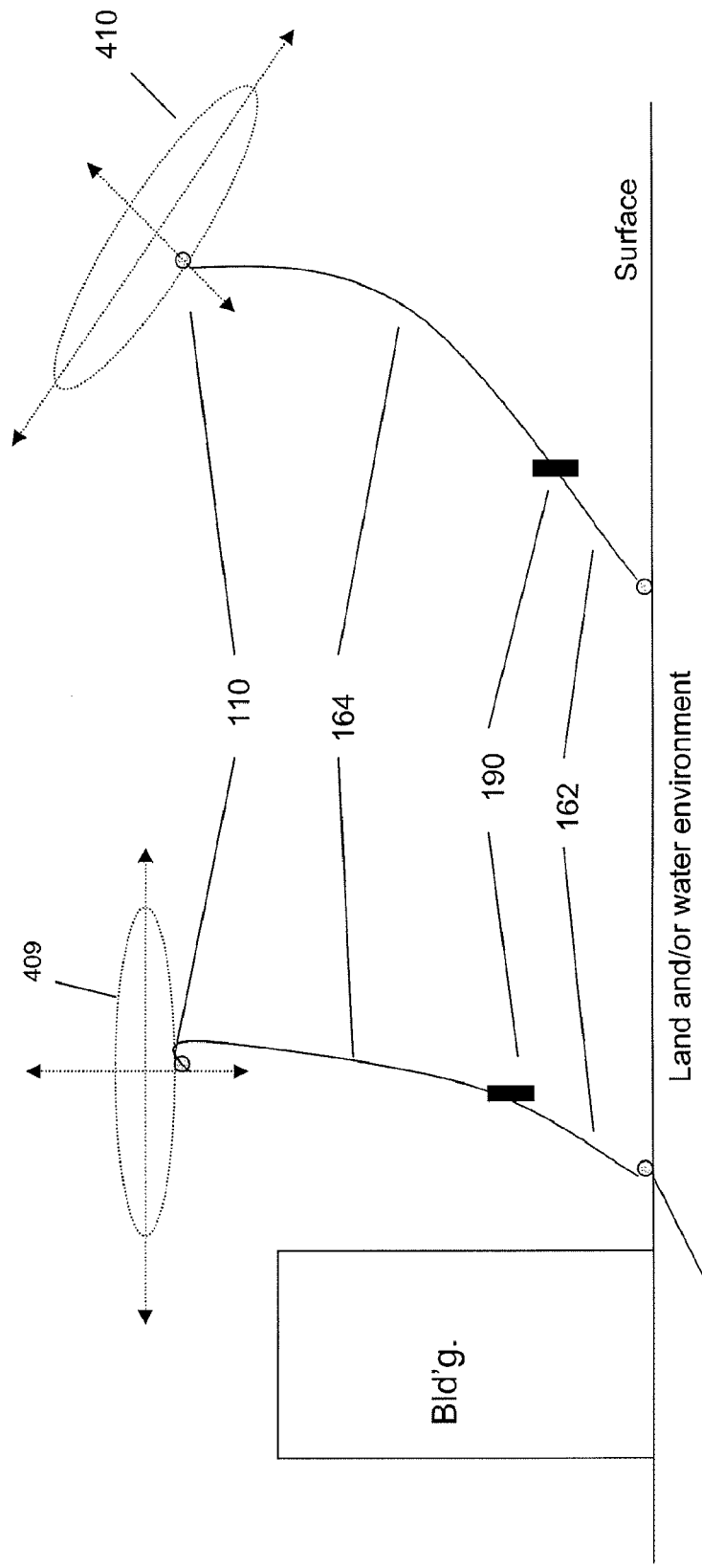
FIGS. 3A, 3B are diagrammatic illustrations of a UAV-sensor application according to an embodiment of the invention.

FIG. 3A illustrates a scenario in which a CBRN sensor 175 is used to monitor the atmospheric environment near ground level in an urban setting. FIG. 3B also shows a towing and skimming maneuver for skimming the sea surface to achieve high coverage rates and enhanced detection of surface contaminants. According to this scenario, the UAV 110 is flown in an altitude tilted orbit 410 with a forward surface speed ranging from near zero to the maximum forward speed of the UAV.

Figure 10:
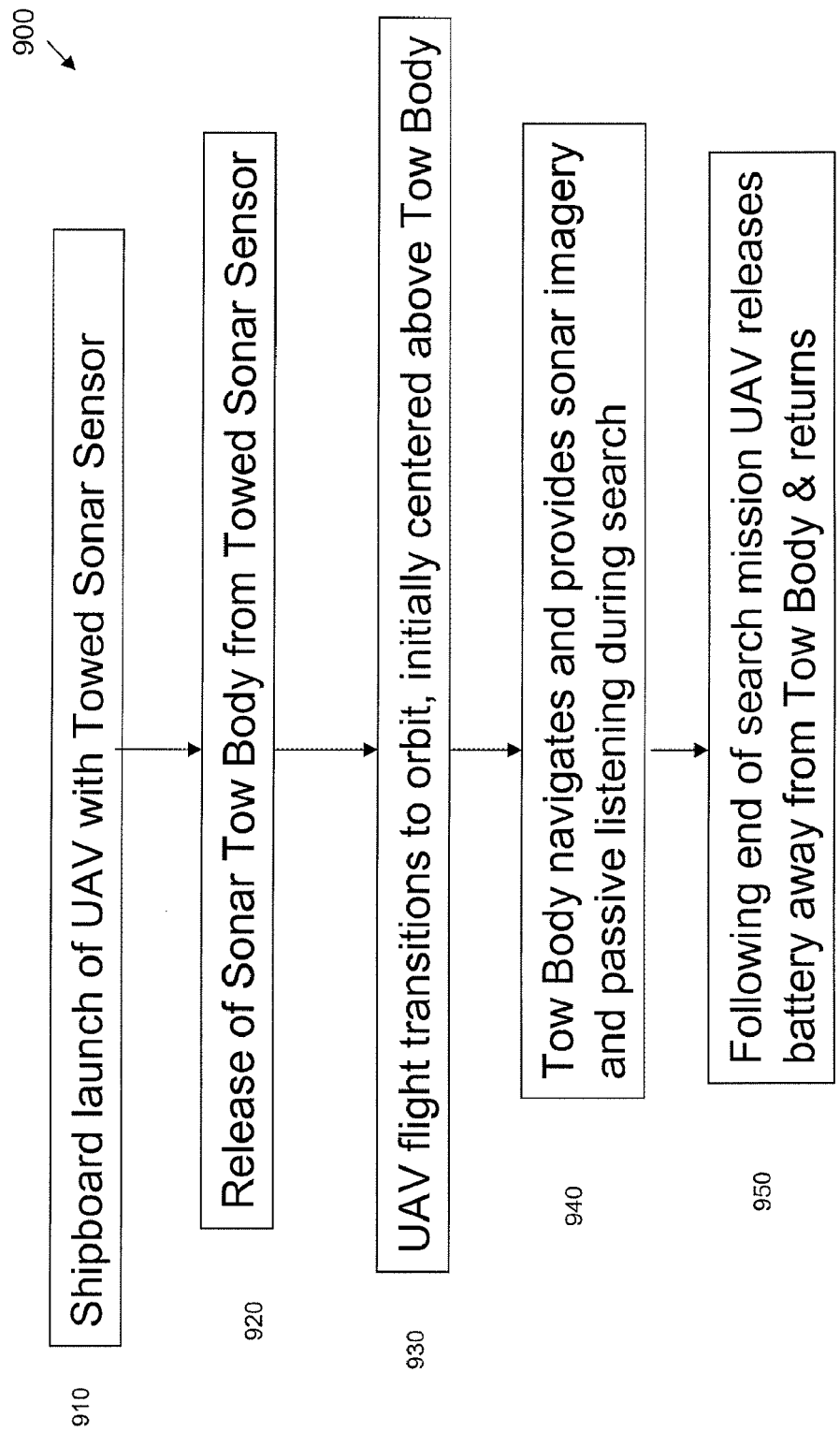
FIG. 10 is a block flow diagram of an exemplary UAV-sensor mission maneuver according to an embodiment of the invention.

FIG. 10 is a flow block diagram that illustrates an illustrative autonomous execution of an SUAV mission. At block 910, the SUAV with a tethered sonar sensor is launched from a shipboard platform. According to the illustrative mission scenario, the SUAV proceeds along a 100 mile flight to a target area. At block 920, the sonar tow body is released from the UAV, which is flying at a 100 foot altitude with a 50 knot air speed. The tow body is attached to the SUAV via a 2500 foot long tow line. The tow line is paid out in a controlled, speed limited manner via the winch/reel 121 and tow body deployment system 119 (see FIG. 7) in the SUAV as the SUAV climbs in altitude. At block 930, the SUAV climbs to a 1000 foot altitude and begins a circular orbit having a 400 foot diameter that is tilted in a plane toward the tow line perpendicular. The SUAV moves away at a one knot speed in the direction of a search track while the SUAV orbits at a 50 knot air speed. The tow line slack is gradually taken up along the line of search. The tow body is towed in a forward direction at a speed of one knot during the search. The elasticity characteristics of the tow line accommodate tow line elongation and orbit-induced range variations. At block 940, the tow body navigates and provides sonar imagery and passive listening during the search. A search area of approximately 10 square miles can be covered over about 8 hours of search time. Finally, at block 950, the battery is released from a hinged tow body section and the lightened tow body is reeled in to the SUAV, which returns via the 100 mile flight to the launch point.

The foregoing description of the embodiments of the invention have been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A UAV-sensor towing package, comprising:
   a fixed-wing UAV including a control and signal processing platform, a long range data RF link operably connected to the control and signal processing platform, a UAV wireless data link operably connected to the control and signal processing platform, and a tow body deployment system operably connected to the control and signal processing platform;
   a tow line attached at an end thereof to the UAV;
   a tow body attached to another end of the tow line; and
   a communications link including a transmitter/receiver component coupled to the tow line, and a transmitter/receiver wireless data transmission link (194) operably connected with the transmitter/receiver component and the UAV wireless data link.

2. The UAV package of claim 1, wherein the communications link further includes a physical data transmission medium (196) operably connected at one end thereof to the transmitter/receiver component and at the other end thereof to the tow body.

3. The UAV package of claim 1, wherein the tow line is a composite tow line including a first tow line portion having a first length and a first tow line elasticity characteristic, and a second tow line portion having a second length and a second tow line elasticity characteristic that are different than the first tow line length and elasticity characteristic.

4. The UAV package of claim 3, wherein the first tow line length is greater than the second tow line length, further wherein the tow line elasticity characteristic is expressed as elongation as a function of tension, and the first tow line elasticity characteristic is less than the second tow line elasticity characteristic.

5. The UAV package of claim 1, wherein the tow body is a SONAR based sensor for use in an underwater tow medium.

6. The UAV package of claim 1, wherein the tow body is controllably releasable from the tow line.

7. The UAV package of claim 1, wherein the tow body is controllably navigable in an underwater tow medium.

8. The UAV package of claim 1, wherein the tow body is a CBRN-based sensor for use in an atmospheric tow medium.

9. The UAV package of claim 1, wherein the UAV is an SUAV.

* * * * *